United States Patent

Downey et al.

[11] 4,341,497
[45] Jul. 27, 1982

[54] PREVAILING TORQUE BOLT

[75] Inventors: Gerald P. Downey, Sterling Heights; Arthur J. McKewan, Rochester, both of Mich.

[73] Assignee: Microdot Inc., Darien, Conn.

[21] Appl. No.: 136,696

[22] Filed: Apr. 2, 1980

[51] Int. Cl.³ .............................................. F16B 39/30
[52] U.S. Cl. .................................................. 411/311
[58] Field of Search ............... 411/311, 310, 309, 308, 411/307, 259, 414, 423, 411, 285; 10/10 R

[56] References Cited

U.S. PATENT DOCUMENTS

| | | | |
|---|---|---|---|
| 2,377,405 | 6/1945 | Davies | 411/309 |
| 3,196,918 | 7/1965 | Hampton | 411/311 |
| 3,247,877 | 4/1966 | Evans | 411/311 |
| 3,301,299 | 1/1967 | Stanwick | 411/309 |
| 3,342,234 | 9/1967 | Evans | 411/311 |
| 3,381,733 | 5/1968 | Stanwick | 411/310 |
| 3,721,283 | 3/1973 | Evans | 411/311 |
| 4,150,702 | 4/1979 | Holmes | 411/310 |
| 4,171,012 | 10/1979 | Holmes | 411/285 |

OTHER PUBLICATIONS

"Product Engineering", Apr. 1979, pp. 55–59, Holmes Fastening Systems Brochure.

Primary Examiner—Ramon S. Britts
Attorney, Agent, or Firm—Lyman R. Lyon

[57] ABSTRACT

A threaded fastener, such as a bolt, has an externally threaded shank with a standard thread portion along its end portion and a modified thread portion adjacent to it, the modified thread portion having a substantially inclined root section enlarged to interfere with and swage the crest of an internal thread in contact with it and having the leading flank adjacent the inclined root backset to provide space for the swaged crest.

5 Claims, 3 Drawing Figures

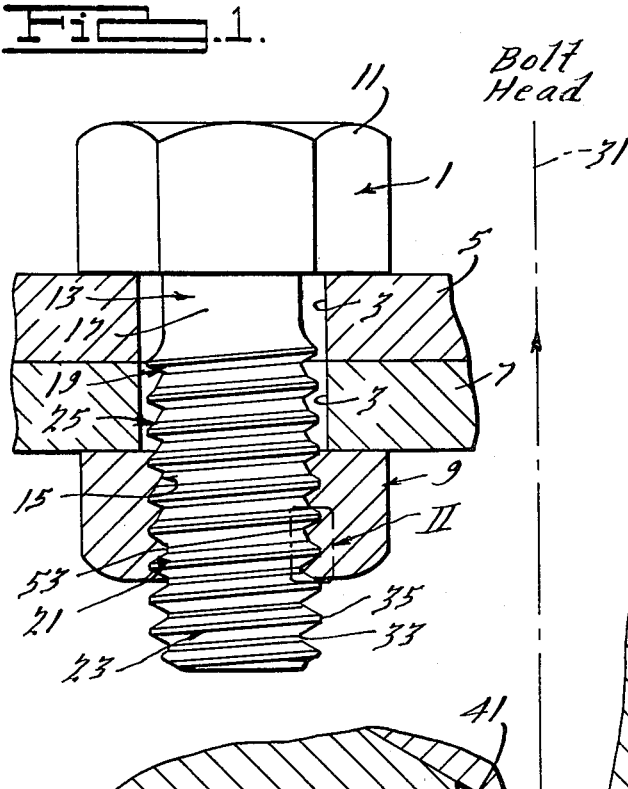
Fig.1.
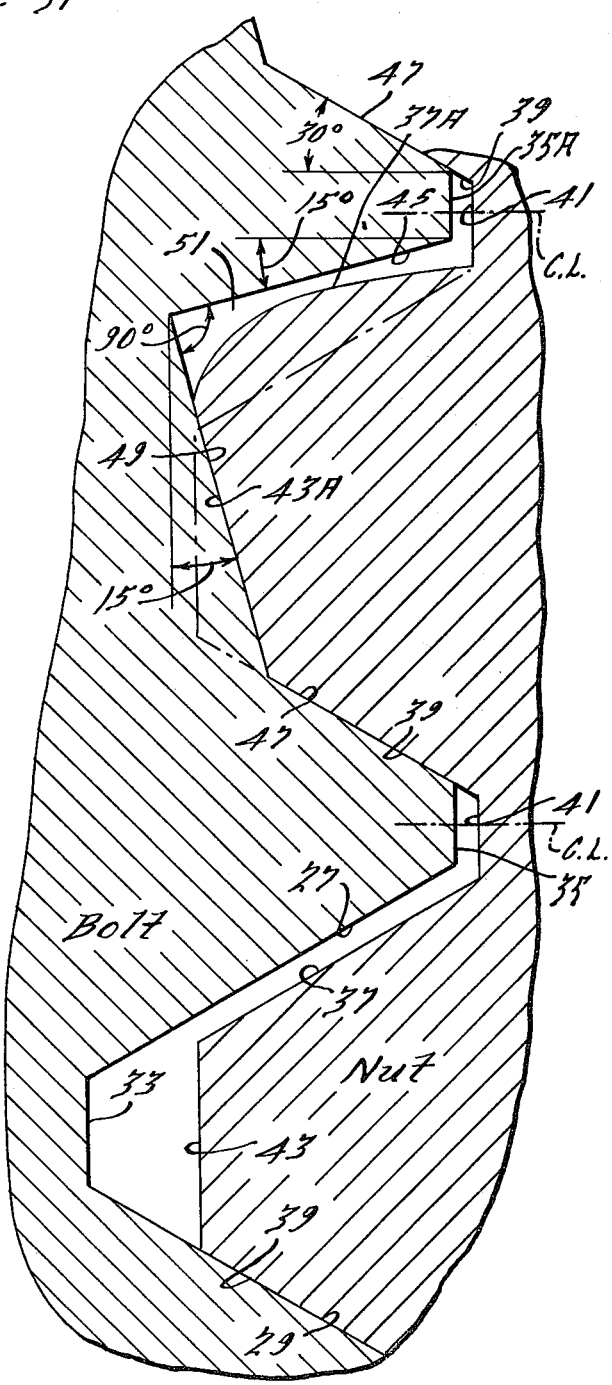
Fig.2.
Fig.3.

PREVAILING TORQUE BOLT

BRIEF SUMMARY OF THE INVENTION

The purpose of this invention is to provide an external thread design for fasteners, such as bolts and screws, which is shaped to swage the crests of mating internal threads and thereby provide an interference fit and prevailing torque that resists self-loosening. The invention is preferably used with standard thread forms (such as American Standard for Unified Threads and metric equivalents) and may be incorporated in the fastener by a relatively simple change in the thread rolling dies. An important feature of the invention is the combination of a substantially inclined and enlarged root and a backset leading flank whereby special clearance space is provided to accept flow of the internal thread crest as it is swaged by the inclined external thread root and whereby dimensional variations within thread tolerance limits are accommodated with minimum possibility of galling, seizing, or loss of function.

DESCRIPTION OF THE DRAWINGS

FIG. 1 is a cross section through a joint fastened together by a bolt embodying the invention;

FIG. 2 is an enlarged cross section of mating threads under clamp load within the loop designated II in FIG. 1; and FIG. 3 is a cross section of the bottom threads of FIG. 2 but with the nut being removed from the bolt to show reformation of the crest of the nut threads. Note: Sharp corners, rather than rounded, are shown in the drawings to facilitate illustration.

DESCRIPTION OF THE INVENTION

An externally threaded fastener in the form of bolt 1 extends through aligned apertures 3 in plates 5 and 7 and into a nut 9 to form means for clamping the plates together. The bolt has a head 11 bearing against the outside of plate 5 and a shank 13 that threads through an aperture 15 in nut 9 so that relative rotation in a direction to create tension in the shank and compression in the nut results in pressure of the bearing surface of the nut against the outside of plate 7 and the desired clamping force to hold the assembly together.

The shank 13 has an unthreaded section 17 adjacent the head 11 but the remainder of the shank has a continuous helical external thread 19 of uniform pitch and uniform major diameter rolled into it. The aperture 15 of the nut is formed into a continuous helical internal thread 21 of uniform pitch which is the same as that of the external thread. The shank thread 19 comprises a standard portion 23 at the end of the shank and extending for a selected shank length toward the head 11 (preferably about 1-3 pitch lengths) and the remainder 25 of the thread 19 is modified in a manner to be described hereinafter. The nut thread 21 is of uniform configuration throughout its entire length and it mates with and is initially free running on the standard shank thread portion 23 but not on the modified portion 25.

The standard shank thread portion 23 that is illustrated in American Standard Unified form of substantially V-shape with truncated root and crest and symmetrical leading and trailing flanks 27 and 29 making substantially 30° angles with imaginary planes perpendicular to the axis 31 of the bolt (i.e. 60° thread angle). The thread portion 23 has a minor diameter or root 33 and a major diameter or crest 35. The nut thread 21 fits the shank thread portion 23 in accordance with standard practice, e.g. class 2B or 3B American Standard Unified nut thread and 2A bolt thread. The nut thread 21 has symmetrical leading and trailing flanks 37 and 39 making substantially 30° angles with imaginary planes perpendicular to the axis 31, a major diameter or root 41, and a minor diameter or crest 43. Thus, initially, at least, or before first assembly, nut 9 is preferably a standard nut, available on the open market.

The leading flank 45 of the modified thread portion 25 is backset with respect to the corresponding flank 27. It is asymmetric with trailing flank 47 by virtue of a change in flank angle from 30° to an angle of 15° with an imaginary plane transverse to bolt axis 31. Trailing flank 47 (like trailing flanks 29 and 39) makes an angle of 30° with such plane. Also, the flank 45 is moved closer to the center line C.L. of the standard bolt thread crest 35 so that the crest 35A of the modified thread portion 25 is narrower. In the bolt thread illustrated, the truncated crest width has been reduced by about 25% on the leading flank side of the crest center line so that crest 35A is about 75% of the width of crest 35. Thus, the backset of leading flank 45 preferably comprises both a decrease in its flank angle and a shift of its position by virtue of a reduction in standard crest width.

In accordance with the invention, the truncated root 49 of the modified thread portion 25 is inclined (converges toward head 11) as a ramp and on a larger diameter than either root 33 or nut thread crest 43. The angle made by inclined root 49 is substantially greater than the locking angle of 6° or so where seizure might occur and is preferably 15° with respect to bolt axis 31, thus providing in the preferred form illustrated an included angle where it intersects the leading flank 45 of 90°.

The diameter of the inclined root 49 is selected so that, no matter where it and the crest 43 are within their respective permissible ranges of dimensional variations or tolerance limits, there will be interference and, therefore, substantial swaging or deformation by the harder bolt metal of the softer nut thread metal when sufficient torque is applied to screw the thread portion 25 into the nut and apply clamp loading to the bolt and nut. For example, with a ⅜" nominal size bolt, the basic root size may be selected so that there is a minimum interference of about 0.015" on a diameter (one half that on a crest) with respect to the basic crest size of the nut thread. This dimension plus the 15° angle and the standard tolerance limits define the root 49.

The direction of clamp loading in the bolt is shown by the arrowhead on axis 31. It is, in part, taken as pressure between the trailing flank 39 of the nut thread 21 and trailing flank 47 of the modified shank thread 25. Clamp loading will also be taken as pressure between the deformed crest 43A of the nut and inclined root 49. Crest 43 must be deformed to conform to the surface of root 49 because of the larger size of the inclined root 49 and greater hardness of the bolt material. The excess nut thread metal deforms toward the leading flank 37 causing it to move outwardly to form curved leading flank surface 37A. Because of the substantial incline of root 49 and backset of leading flank 45, there is a distinct, special clearance space available at 51 adjacent the 90° intersection of inclined root 49 and leading flank 45 to accept the distortion and plastic flow due to swaging of the nut thread. To the extent that this is elastic deformation, there is interference and prevailing torque to resist self-loosening of the bolt and nut. To the extent that this movement of metal is plastic and permanent, the nut thread is enlarged so that it will no longer fit within the standard bolt thread 23, i.e., it is wider than the space between flanks 27 and 29. Thus, in order to disassemble the nut and bolt, the deformed nut thread must be swaged again by the application of sufficient torque to unthread the parts. When this is done (as in FIG. 3), the softer nut metal will be reworked to suit the shank thread portion 23, as indicated schematically by the new shape 37B of the nut leading flank and new crest shape 43B. After the nut 9 has been removed, surfaces 37B, 43B, and 39 will fit threads 23 of bolt 1 as well as other bolts of the same external thread dimensions so that it can be reused if its condition is otherwise acceptable.

The standard thread portion 21 of the bolt is joined to the modified thread portion 25 by a transition thread portion 53 comprising a gradual, progressive change in thread shape and size from the standard thread form to the modified thread form. This can be done in approximately 180° to 360°. Prior to entry of the transition portion 53 into the nut 9, there is a standard, free-running connection between bolt and nut. However, once the portion 53 reaches the nut thread, a torque increase will be needed to swage the nut thread and permit the assembly of nut and bolt to progress. When this reaches the point where the crest is wider than the distance between the flanks of standard bolt thread portion 23, the nut cannot be backed off the bolt without application of sufficient reverse torque to reswage the nut thread as mentioned above.

While the bolt 1 of this invention has been illustrated in assembly with a standard nut 9, it is evident that it can be used with equal, if not greater, advantage in a tapped, hole of standard thread form corresponding to nut thread 21 which is longer than the bolt shank. In this application the transition thread is continuously mating with the internal threads. Consequently, torque is required to thread the bolt into or out of the hole in order to swage or reswage the internal threads. This consideration indicates the advantage in bolt and nut assemblies according to the invention of choosing a bolt length such that the transition thread 53 is inside the nut when the desired clamp load is reached.

By virtue of the modified thread of the invention, in which the root 49 is enlarged and formed on a substantial incline well above the locking angle, there is a defined, ample clearance space 51 at one end of the root for nut metal that is moved during swaging. The trailing flanks 39 and 47 can have normal, standard engagement. The substantial incline minimizes the tendency of the metal to gall or seize under the pressures achieved between the threads and also minimizes the effects of wide dimensional variations within tolerance limits.

Modifications in the details illustrated and described may be made without departing from the spirit and scope of the invention.

We claim:

1. In a threaded fastener, a shank having an end adapted to enter a tapped hole containing a uniform internal helical thread of a standard thread form, said shank having an external helical thread thereon of uniform pitch extending along the length of the shank to said end, said external thread comprising helical leading and trailing flanks, a helical root, and a helical crest, said external thread having a first portion of standard thread form extending to said end and adapted for free running assembly in said internal thread, said external thread having a second portion of modified thread form extending from said first portion in a direction away from said shank end, said modified thread form being asymmetric and having a leading flank that is substantially backset compared to the leading flank of said standard thread form and a trailing flank that has substantially the same flank angle as the trailing flank of said standard thread form, said modified thread form having a root that is substantially larger in diameter and in length than the root of the standard thread form and inclined to converge in a direction extending away from said shank end on an angle of substantially 15° to the axis of the shank, said backset leading flank and said inclined root defining and providing a clearance space to accept the portion of the standard internal thread that is caused to elastically and plastically move upon assembly of said internal thread with said modified portion due to swaging of the internal thread by the substantially enlarged and inclined root of said modified thread form.

2. A fastener as set forth in claim 1 wherein the basic root size of said modified thread form is selected to have a minimum interference of about 0.015" on a diameter with respect to the standard internal thread.

3. A fastener as set forth in claim 2 wherein said thread forms have truncated crests and roots, the leading flank of said modified thread form being backset so that the crest of said modified form is about 75% of the width of the crest of the standard thread form portion of the external thread.

4. A fastener as set forth in claim 3 wherein said trailing flanks have flank angles of about 30° and the leading flank of said modified thread form has a flank angle of about 15°.

5. A fastener as set forth in claim 4 including a transition thread form portion of progressively increasing root size in said external thread between the standard thread form portion and the modified thread form portion.

* * * * *